United States Patent [19]

Schmohe

[11] 4,195,718
[45] Apr. 1, 1980

[54] RETRACTABLE SHAFT STRUCTURE

[75] Inventor: James S. Schmohe, Rockford, Ill.

[73] Assignee: Sundstrand Corporation, Rockford, Ill.

[21] Appl. No.: 892,133

[22] Filed: Mar. 31, 1978

[51] Int. Cl.² .................... F16D 11/04; F16D 13/74; F16D 47/02
[52] U.S. Cl. ..................... 192/67 R; 64/23; 64/32 F; 74/15.66; 74/18; 192/93 C
[58] Field of Search ............. 192/67 R, 93 C, 113 B; 74/15.2, 15.6, 15.63, 15.66, 15.69, 16,18; 403/11, 13, 14; 64/23, 32 F

[56] References Cited

U.S. PATENT DOCUMENTS

| | | | |
|---|---|---|---|
| 2,109,519 | 3/1938 | Altorfer | 74/16 |
| 2,365,146 | 12/1944 | Wichorek | 64/23 X |
| 2,445,417 | 7/1948 | Bohannon | 74/15.6 |
| 2,509,813 | 5/1950 | Dineen | 192/101 |
| 2,642,810 | 6/1953 | Robinson | 103/162 |
| 2,642,970 | 6/1953 | Szekely | 192/67 R X |
| 2,718,381 | 9/1955 | Moon | 64/32 F X |
| 3,071,227 | 1/1963 | Grisier, Jr. | 192/101 |
| 3,126,080 | 3/1964 | Travis et al. | 192/94 |
| 3,187,868 | 6/1965 | Gantzer | 192/101 |
| 3,248,954 | 5/1966 | Blake et al. | 74/16 |
| 3,600,106 | 8/1971 | Baits | 417/190 |
| 3,760,920 | 9/1973 | Delfeld | 64/23 X |
| 4,042,088 | 8/1977 | Schmohe | 74/15.66 X |

*Primary Examiner*—Allan D. Herrmann
*Attorney, Agent, or Firm*—Wegner, Stellman, McCord, Wiles & Wood

[57] ABSTRACT

A retractable shaft structure for interconnecting a unit, such as a constant speed drive, to a power source, such as an engine gear box, wherein the unit has an input drive axis and the gear box has an output drive axis and the unit is moved transversely to said axes to bring the axes into alignment. A drive shaft defining the input drive axis and carried by the unit has a drive input end extending beyond said unit for connection into driving relation with an output shaft of the gear box. The drive shaft is mounted for adjusting movement along the input drive axis to have the drive shaft retracted during said transverse movement, followed by extension thereof. Rotatable mounting structure, independent of the unit, mounts the drive input end of the input shaft and is held in fixed relation therewith to move with the drive shaft during said adjusting movement and said rotatable mounting structure is releasably connectable to the gear box to be held in fixed relation thereto.

14 Claims, 3 Drawing Figures

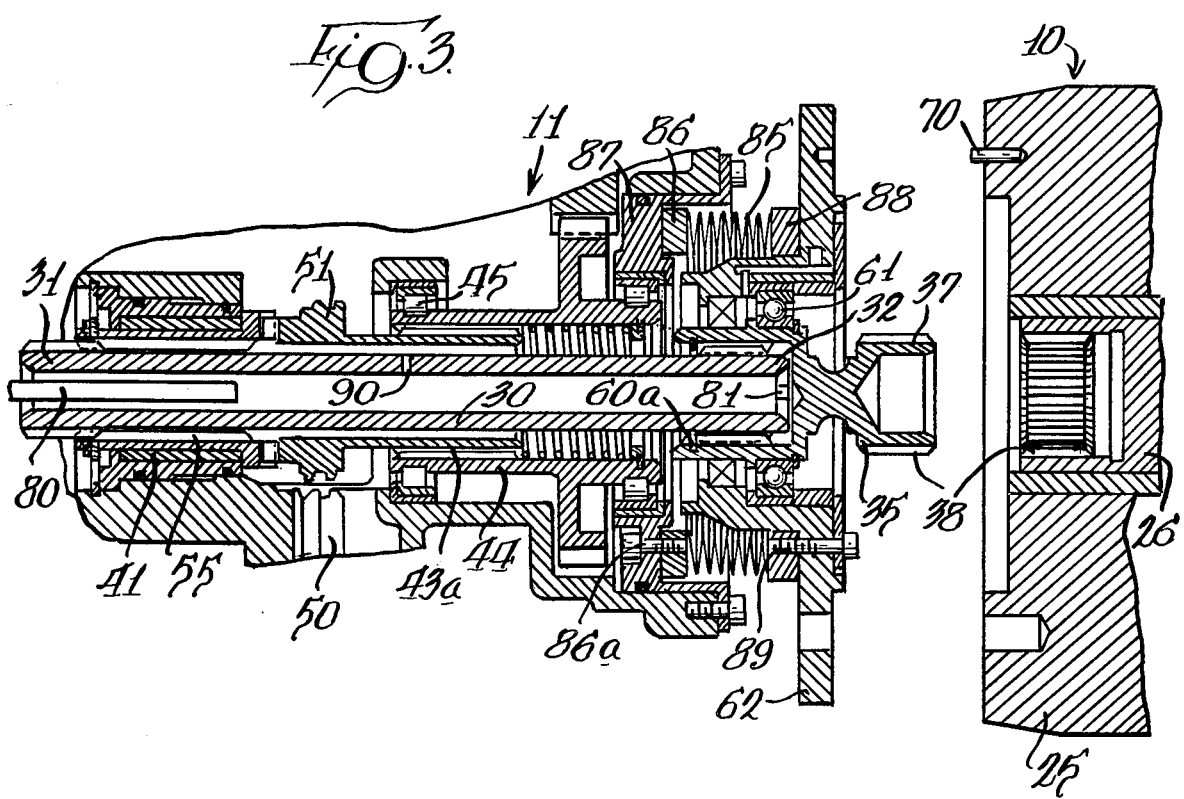

RETRACTABLE SHAFT STRUCTURE

BACKGROUND OF THE INVENTION

This invention pertains to retractable shaft structure and, more particularly, to a constant speed drive unit having the retractable shaft structure whereby the shaft may be retracted to permit positioning of the constant speed drive unit relative to a mounting as to the engine gear box of an aircraft engine, with subsequent drive connection by outward extension of the retractable shaft.

A constant speed drive is commonly used in association with aircraft for providing a uniform speed drive to an electrical generator to alternator, regardless of the speed of the engine. On occasion, the drive to the generator or alternator needs to be interrupted and this is accomplished by the provision of a quick-disconnect coupling within the constant speed drive unit. This quick-disconnect coupling is known in the art and may take many different forms, including the movement of a primary drive shaft in the mechanical power train, as in Grisier Pat. No. 3,071,227. Other versions of such couplings include relatively movable disengageable clutch elements, rather than movement of the drive shaft. In connecting a constant speed drive to a power source, such as an engine gearbox, it is normal to have a drive shaft or part associated therewith extending beyond the housing of the constant speed drive unit for driving engagement with a component of the engine gearbox. This structure does not involve any problem in assembly or disassembly of the unit to the gearbox when there is sufficient room for the unit to move in a direction axially of the drive shaft. When such room is not available, there is then a problem in bringing the parts into operative relation and making the drive connection.

Also, it is normal to mount the constant speed drive unit to a drive pad on the engine gearbox which provides for accurate orientation of the components. However, in certain instances, it is not possible to make this mounting and the constant speed drive unit is mounted at a remote location with the result that there can be misalignment between the two components and which requires some adaptability to this misalignment in the drive train.

SUMMARY OF THE INVENTION

A primary feature of the invention is to provide a new and improved easily operated retractable shaft structure which is carried by a unit which is to receive power by connection to a power source. The retractable shaft is a drive shaft for the unit, with the drive shaft being mounted within the unit for adjusting movement along the axis thereof and having a drive input end extending beyond the unit and supported by rotatable mounting means which are releasably attachable to a support, such as the casing of the power source.

Still another feature of the invention is to provide a structure, as defined in the preceding paragraph, wherein misalignment is compensated for by having the drive shaft provided with a pair of crowned spline means, an oil tube extends within the tubular drive shaft for supplying lubricating oil under pressure to said spline means for lubrication thereof, and an annular expansible member surrounds the exposed drive input end of the drive shaft for confining the lubricating oil which flows through the spline means.

An object of the invention is to provide a retractable shaft structure for interconnecting a constant speed drive unit and an engine gearbox wherein the unit has an input drive axis and the gearbox has an output drive axis and the unit is moved transverse to said axes to bring the axes into alignment comprising, a drive shaft rotatable about the input drive axis and carried by said unit and having a drive input end extending beyond the housing of said unit for connection into driving relation with an output shaft of the gearbox, means within the unit mounting said drive shaft for adjusting movement along the input drive axis, means rotatably mounting the drive input end of the input shaft and held in fixed relation therewith for said adjusting movement, and means for releasably attaching the rotatable mounting means to said gearbox.

Another object of the invention is to provide a unit connectable to a power source wherein the unit has an input drive axis and the power source has an output drive axis and said unit, in assembly, is moved transverse to said axes to bring the axes into alignment, the unit having a housing with a tubular drive shaft with an inner end therein and an exposed drive input end, means mounting the drive shaft in the housing for relative longitudinal movement, means outside of the housing mounting bearing means, an interconnecting member with a tubular recess mounted in said bearing means with the drive input end of the drive shaft in said recess and held against removal, crowned spline means between said drive input end and the interconnecting member, means for removably attaching bearing mounting means to a casing for the power source, an oil supply tube extending into the inner end of the drive shaft for delivering lubricating oil to said spline means, and a tubular bellows of oil-resistant material surrounding said drive input end of the drive shaft and connected between the unit housing and the bearing mounting means.

Still another object of the invention is to provide a structure, as defined in the preceding paragraph, wherein said unit is a constant speed drive and the power source is a jet engine having a gearbox, a quick-disconnect coupling in the housing includes a rotatably-mounted tubular member receiving the inner end of the drive shaft, and crowned spline means between said inner end of the drive shaft and said rotatably-mounted tubular member also supplied with lubricating oil from the oil supply tube.

BRIEF DESCRIPTION OF THE DRAWINGS

FIG. 3 is a view, similar to FIG. 2, showing the drive shaft retracted.

DESCRIPTION OF THE PREFERRED EMBODIMENT

Figure 1:
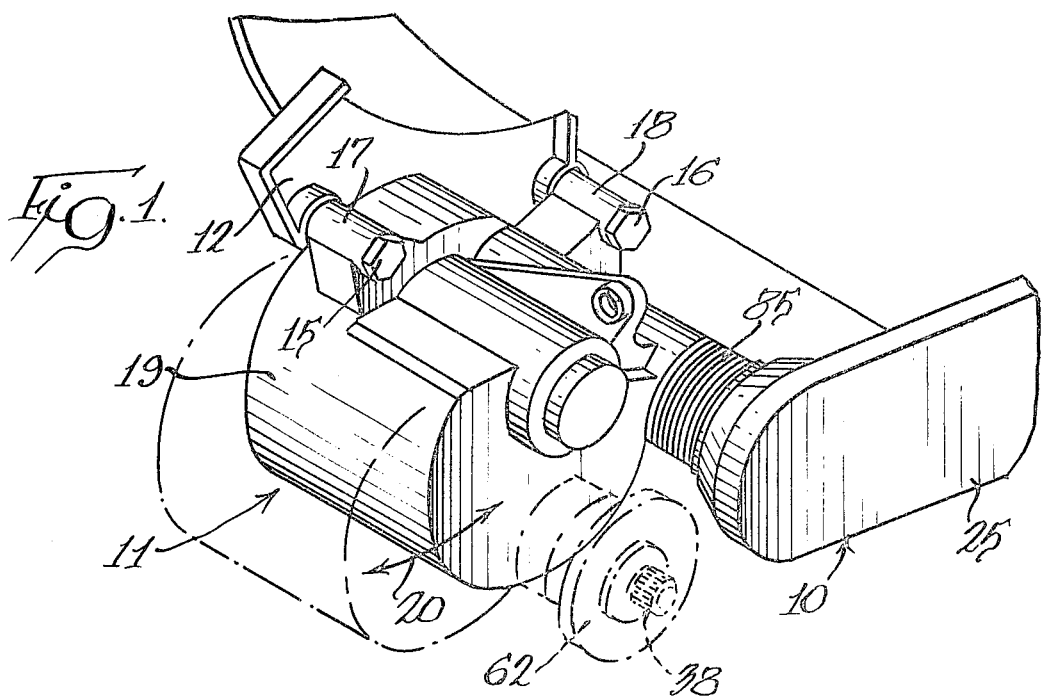
FIG. 1 is a fragmentary perspective view showing a constant speed drive unit in association with a jet engine gearbox and showing the unit in a retracted broken line position.

A jet engine (not shown) has a gearbox, indicated generally at 10, and provides a power source for driving a constant speed drive unit, indicated generally at 11, and which is associated with the gearbox by suitable mounting structure, with one example of a mounting being shown in FIG. 1. The mounting includes a plate 12 supported by the jet engine which receives a pair of mounting bolts 15 and 16 which extend through tubular members 17 and 18 formed in the housing 19 of the constant speed drive unit and threadably engaged in openings in the member 12.

The gearbox 10 and mounting plate 12 are located and spaced in a manner which prevents assembly of the unit 11 to the gearbox with interconnection of a drive train by movement of the unit in a direction longitudinally of the drive shaft of the unit. As shown in FIG. 1, the unit is assembled to the gearbox and disassembled therefrom by movement in the directions indicated by the arrow line 20. This is a movement transverse to input and output drive axes which are defined hereinafter. This enables movement of the unit between the assembled position, shown in full line in FIG. 1 and a position preliminary to assembly or after disassembly, as shown by broken line in FIG. 1.

Figure 2:
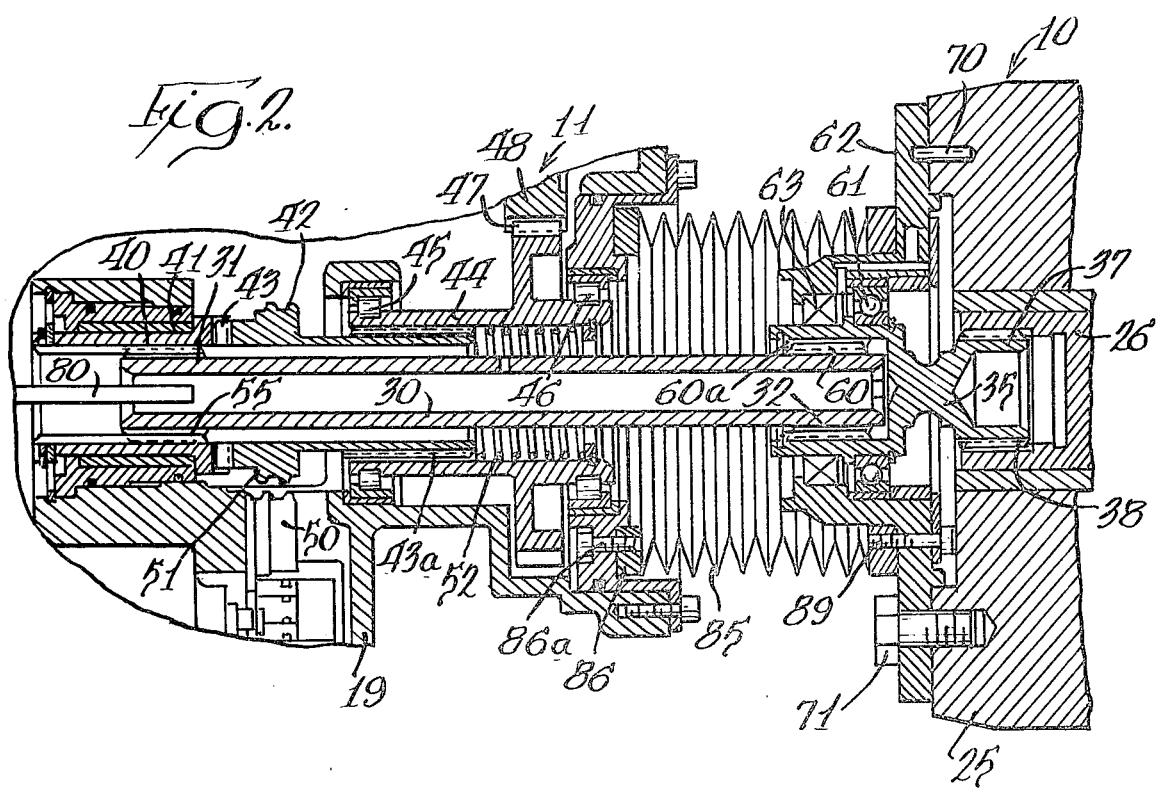
FIG. 2 is a fragmentary section of the structure shown in FIG. 1, taken centrally of the drive shaft of the constant speed drive unit.

The structure is shown in greater detail in FIGS. 2 and 3. The gearbox 10 has a casing 25 which rotatably mounts an output shaft 26 by structure (not shown) within the casing and with this output shaft having an axis of rotation which is an output drive axis for the gearbox.

The constant speed drive unit 11 has a drive shaft 30 of tubular construction, an inner end 31 and a drive input end 32. The axis of rotation of the drive shaft 30 defines an input drive axis.

In the assembled relation of FIG. 2, the drive shaft 30 is operatively connected into the output shaft 26 by an interconnecting member 35 which has a recess to receive the drive input end 32 of the drive shaft. Additionally, this interconnecting member has a section 37 which fits within a recess of the output shaft 26 and which is drivingly connected thereto by spline means 38 formed on the interconnecting member externally thereof and internally of the recess of the output shaft 26.

In the assembled relation of FIG. 2, the input drive axis of the unit 11 is coincident with the output drive axis of the gearbox 10. With the movement of the unit 11 in assembly being in the direction of the arrow line 20, it will be seen that the normal extended positions of the drive shaft 30 and interconnecting member 35 would result in interference with the casing 25 of the gearbox. For this reason, the drive shaft 30 is retractable to the position shown in FIG. 3 to prevent this interfering relation during assembly and disassembly.

The constant speed drive unit 11 has a drive train for transmitting rotation from the gearbox to hydraulic components (not shown) of the constant speed drive. A structure of this general type is shown in Gantzer Pat. No. 3,187,868, granted June 8, 1965. Rotation of the drive shaft 30 is imparted to a tubular member 40 rotatably mounted in the housing of the unit by a journal bearing 41. This tubular member connects to a sleeve member 42 of a quick-disconnect coupling structure by way of a clutch 43. With the clutch engaged, the drive of the sleeve 42 is transmitted by a spline connection 43a to a tubular drive member 44 which is rotatably mounted in the housing 19 by bearings 45 and 46. This tubular member has an external gear 47 which meshes with a gear 48.

The quick-disconnect coupling structure is known in the art, with a structure similar to that shown in FIG. 2 being shown in FIG. 3B of Gantzer Pat. No. 3,365,981, granted Jan. 30, 1968. Another example of disconnect structure is shown in my prior U.S. Pat. No. 4,042,088.

A plunger assembly including a plunger 50 having teeth at the inner end thereof may be moved, such as by release of a solenoid cocked spring, inwardly toward the sleeve 42 to engage with teeth 51 formed externally thereof. Upon such engagement, the continued rotation of the sleeve 42 causes movement of the sleeve to the right, as viewed in FIG. 2, because of the helical arrangement of the engaging teeth on the plunger and the sleeve to disengage the clutch 43 whereby the drive train is disconnected. This movement of the sleeve member 42 is against a spring 52 whereby, upon retraction of the plunger 50, the spring 52 can return the sleeve member to the left for re-engagement of the clutch 43.

The tubular member 40 mounted in the journal bearing 41 drivingly connects to the inner end 31 of the drive shaft by crowned spline means 55 which drivingly interconnect these parts while permitting longitudinal movement of the drive shaft relative to the tubular member, as well as some rocking movement to accommodate misalignment between the unit 11 and the gearbox 10.

An additional crowned spline means is provided between the drive input end 32 of the drive shaft 30 and the interconnecting member 35, as indicated at 60, whereby the crowned spline means 55 and 60 enable a good drive connection even with misalignment of the constant speed drive unit 11 to the gearbox 10.

The drive shaft 30 is held to the interconnecting member 35 for simultaneous adjusting movement by an expansible ring 60a in the recess of the member.

The interconnecting member 35 and, therefore, the drive input end 32 of the drive shaft are rotatably supported by bearing means 61 having the inner race thereof fitted to the interconnecting member 35 and the outer race carried by a mounting member 62 generally in the form of a plate having a central annular opening for the bearing.

Additionally, an annular oil seal 63 is fitted between the mounting member 62 and the interconnecting member 35 to control flow of lubricating oil which is to be described.

In assembled relation, the mounting plate 62 is located relative to the casing 25 of the gearbox by one or more locating pins 70 and secured thereto by one or more attaching bolts 71 extended through openings in the plate and engaged in threaded openings in the casing wall.

Referring to the structure shown in FIG. 3, the mounting plate 62 is detached from the gearbox casing 25 which permits retraction of the drive shaft 30 and movement of the mounting plate toward the left within the housing 19 of the unit 11. This movement is permitted by the crowned spline means 55. With the shaft retracted, as shown in FIG. 3, the unit 11 can then be moved from the broken line position of FIG. 1 to the full line position and the drive shaft extended and the unit fastened relative to the engine. With the drive shaft extended, interconnecting member 35 moves into engagement with the output shaft 26 of the gearbox and the plate 62 is brought into abutting relation with the casing of the gearbox and the plate can then be secured thereto to provide a fixed mounting for the bearing support for the drive input end 32 of the drive shaft 30.

The crowned spline means 55 and 60 require lubrication. The lubrication is provided by a lubricating oil tube 80 which extends into the tubular drive shaft at the inner end 31 thereof for supplying lubricating oil under pressure to the interior of the drive shaft. This oil flows through the drive shaft to the drive input end thereof and is thrown outwardly through oil passage means in the form of grooves 81 at the end of the drive shaft into the recess of the interconnecting member 35 for flow through the crowned spline means 60. In order to contain this oil flow, the annular seal 63 is provided. Also, the exposed drive input end 32 of the drive shaft is surrounded by a tubular expansible closure member 85 in the form of a bellows of oil-resistant material. This member has one end connected to a ring 86 which is fastened by fasteners 86a to a bearing support member 87 of the unit. The opposite end of the member is fastened to a ring 88 which is secured to the mounting plate 62, as by threaded fastener members, one of which is shown at 89. With this containment of the lubricating oil, it can then flow through suitable passages provided within the unit and is prevented from being thrown into the area surrounding the gearbox and the unit 11.

Additionally, lubricating oil can flow through a passage 90 in the wall of the drive shaft as well as out the open end at the inner end 31 of the drive shaft for lubrication of the crowned spline means 55, clutch teeth 43, and spline 43a.

With the structure disclosed herein, it is possible to assemble a unit, such as a constant speed drive unit, to a power source by transverse movement relative to the drive axes of the units and with the drive shaft in the unit being easily shifted between extended and retracted positions. This movement is accomplished merely by movement of the drive shaft relative to the tubular member 40 by relative movement of the spline means 55 therebetween and without there being any major force, such as a spring, opposing the longitudinal adjusting movement of the drive shaft. Additionally, the disclosed structure permits operation even with some misalignment because of the crowned spline means 55 and 60 associated at opposite ends of the drive shaft 30 and with necessary lubrication thereof being provided by lubricating oil supplied thereto. Escape of lubricating oil is prevented by the bellows 85 of oil-resistant material which surrounds the drive input end of the drive shaft and causes lubricating oil to return into the interior of the housing 19 of the drive unit 11.

I claim:

1. A retractable shaft structure for interconnecting a constant speed drive unit and an engine gearbox wherein said unit has a housing and an input drive axis and the gearbox has an output drive axis and said unit is moved transverse to said axes to bring the axes into alignment comprising, a drive shaft rotatable about said input drive axis and carried by said unit and having a drive input end extending beyond said unit for connection into driving relation with an output shaft of the gearbox, means within the unit housing mounting said drive shaft for adjusting movement along the input drive axis, means external of the unit housing rotatably mounting the drive input end of the input shaft and held in fixed relation therewith for movement relative to the housing in said adjusting movement of the drive shaft, and means for releasably holding the rotatable mounting means in rigid relation with said gearbox.

2. A retractable shaft structure as defined in claim 1 including an interconnecting drive member between said output shaft and drive shaft and rotatably carried by said rotatably mounting means.

3. A retractable shaft structure as defined in claim 2 wherein said interconnecting drive member has a recess to receive the drive input end of the drive shaft, a crowned spline connection between the input end of said drive shaft and said interconnecting drive member, and retaining means to hold said drive input end in said recess.

4. A retractable shaft structure as defined in claim 3 wherein said drive shaft is tubular, an oil supply tube extending into said drive shaft for delivering lubricating oil under pressure, and oil passage means adjacent the drive input end of the drive shaft whereby oil may flow therethrough into said recess to lubricate said spline connection.

5. A retractable shaft structure as defined in claim 4 including a tubular expansible closure surrounding said drive input end and connected between the constant speed drive and said rotatable mounting means to confine said lubricating oil.

6. A retractable shaft structure as defined in claim 5 wherein said closure is a bellows of oil-resistant material.

7. A retractable shaft structure as defined in claim 6 including a quick-disconnect coupling structure in said unit and associated with said drive shaft.

8. A retractable shaft structure as defined in claim 1 including a drive train in said unit having quick-disconnect coupling mechanism comprising an open-ended tubular member rotatably-mounted in said unit, said drive shaft extending into said tubular member, and spline means rotatably interconnecting said drive shaft and tubular member while permitting longitudinal relative movement therebetween during said adjusting movement of the drive shaft.

9. A retractable shaft structure as defined in claim 8 wherein said drive shaft is tubular and has spline means at both ends thereof, and a lubricating oil tube extended into said drive shaft for supplying lubricating oil to said spline means.

10. A retractable shaft structure as defined in claim 9 wherein said rotatable mounting means is in the form of a plate with a central opening mounting bearing means for the drive input end of the drive shaft, and a bellows connected between said unit and plate and surrounding the drive shaft portion which extends out of the unit.

11. A constant speed drive unit connectable to an engine gearbox wherein said unit has an input drive axis and the gearbox has an output drive axis and said unit, in assembly, is moved transverse to said axes to bring said axes into alignment, said unit having a housing with a tubular drive shaft with an inner end therein and an exposed drive input end, a quick-disconnect coupling in said housing including a rotatably-mounted tubular member receiving the inner end of the drive shaft, crowned spline means interconnecting the drive shaft and said tubular member and permitting relative longitudinal movement, means outside of the housing mounting bearing means, an interconnecting member with a tubular recess mounted in said bearing means with the drive input end of the drive shaft in said recess and held against removal, crowned spline means between said drive input end and the interconnecting member, means for removably attaching the bearing mounting means to said gearbox, an oil supply tube extending into the inner end of said drive shaft for delivering lubricating oil to said spline means, and a tubular bellows of oil-resistant material surrounding said drive input end of the drive shaft and connected between the unit housing and said bearing mounting means.

12. A constant speed drive unit connectable to an engine gearbox wherein said unit has an input drive axis and the gearbox has an output drive axis and said unit, in assembly, is moved transverse to said axes to bring said axes into alignment, said unit having a housing with a drive shaft with an inner end therein and an exposed drive input end, a quick-disconnect coupling in said housing including a rotatably-mounted tubular member receiving the inner end of the drive shaft, crowned spline means interconnecting the drive shaft and said tubular member and permitting relative longitudinal movement, means outside of the housing mounting bearing means which rotatably support said drive input end of the drive shaft, crowned spline means at the drive input end of the drive shaft for operative connection to the gearbox and means for removably attaching the bearing mounting means to said gear box.

13. A unit connectable to a power source wherein said unit has an input drive axis and the power source has an output drive axis and said unit, in assembly, is moved transverse to said axes to bring said axes into alignment, said unit having a housing with a tubular drive shaft with an inner end therein and an exposed drive input end, means mounting the drive shaft in the housing for relative longitudinal movement, means outside of the housing mounting bearing means, an interconnecting member with a tubular recess mounted in said bearing means with the drive input end of the drive shaft in said recess and held against removal, crowned spline means between said drive input end and the interconnecting member, means for removably attaching the bearing mounting means to a casing for said power source, an oil supply tube extending into the inner end of said drive shaft for delivering lubricating oil to said spline means, and a tubular bellows of oil-resistant material surrounding said drive input end of the drive shaft and connected between the unit housing and said bearing mounting means.

14. A retractable shaft structure for interconnecting a unit with a power source wherein said unit has a housing and an input drive axis and the power source has an output drive axis and said unit is moved transverse to said axes to bring the axes into alignment comprising, a drive shaft rotatable about said input drive axis and carried by said unit and having a drive input end extending beyond said unit housing for connection into driving relation with an output shaft of the power source, means within the unit housing mounting said drive shaft for adjusting movement along the input drive axis, means movable relative to the unit housing and rotatably mounting the drive input end of the input shaft and held in fixed relation therewith for said adjusting movement, and means for releasably attaching the rotatable mounting means to a casing of said power source.

* * * * *